US008329015B2

(12) United States Patent
Chappuis et al.

(10) Patent No.: US 8,329,015 B2
(45) Date of Patent: Dec. 11, 2012

(54) DIELECTROPHORETIC PROCESS FOR RETAINING POLARIZABLE TARGET-PARTICLES AND DEVICE FOR PERFORMING THAT PROCESS

(75) Inventors: Thierry Chappuis, Fribourg (CH); Damien Voisard, Attalens (CH)

(73) Assignee: Ares Trading S.A., Aubonne (CH)

(*) Notice: Subject to any disclaimer, the term of this patent is extended or adjusted under 35 U.S.C. 154(b) by 879 days.

(21) Appl. No.: 11/629,895

(22) PCT Filed: Jun. 14, 2005

(86) PCT No.: PCT/CH2005/000331
§ 371 (c)(1),
(2), (4) Date: Feb. 19, 2008

(87) PCT Pub. No.: WO2005/123898
PCT Pub. Date: Dec. 29, 2005

(65) Prior Publication Data
US 2008/0264794 A1 Oct. 30, 2008

(30) Foreign Application Priority Data
Jun. 16, 2004 (EP) .................................... 04405368

(51) Int. Cl.
*G01N 27/26* (2006.01)
*G01N 27/447* (2006.01)
*B03C 5/02* (2006.01)
*B03C 5/00* (2006.01)

(52) U.S. Cl. .......................... 204/547; 204/643; 435/7.2
(58) Field of Classification Search .................. 204/547, 204/600-643; 435/7.2
See application file for complete search history.

(56) References Cited

U.S. PATENT DOCUMENTS 4,326,934 A * 4/1982 Pohl .............................. 204/547
5,454,472 A 10/1995 Hagedorn et al.
5,569,367 A * 10/1996 Betts et al. .................... 204/547
5,626,734 A * 5/1997 Docoslis et al. .............. 204/547
5,993,630 A * 11/1999 Becker et al. ................. 204/547
6,492,175 B1 12/2002 Fuhr et al.
2002/0139675 A1* 10/2002 Mariella, Jr. .................. 204/547
2006/0260944 A1* 11/2006 Madou et al. ................. 204/643
2007/0020767 A1* 1/2007 Schnelle ........................ 436/180
2007/0187248 A1* 8/2007 Hodko et al. .................. 204/547
2008/0237046 A1* 10/2008 Hirahara et al. .............. 204/600

FOREIGN PATENT DOCUMENTS

DE 136 895 A 8/1979
DE 199 53 424 A 5/2001
EP 1 277 831 A 1/2003
JP 2006-340628 * 12/2006
WO 99/62622 A 12/1999
WO WO 99/62622 * 12/1999
WO WO2004-098777 * 11/2004

* cited by examiner

*Primary Examiner* — Jeffrey T Barton
*Assistant Examiner* — Jennifer Dieterle
(74) *Attorney, Agent, or Firm* — Browdy and Neimark, PLLC

(57) ABSTRACT

A process and a device for retaining polarizable target-particles from a fluid suspension of polarizable target-particles comprising the steps of pumping that suspension into a vertical or inclined channel and applying an alternating electric field inducing a negative dielectrophoretic force on the target-particles, the force being sufficient to push them a distance of at least or about 25 m from the surface of an electrode-bearing wall, thereby creating an upward-moving clarified fluid zone in the vicinity of that wall and a downward-moving target-particle containing fluid zone at a distance from that wall.

25 Claims, 8 Drawing Sheets

DIELECTROPHORETIC PROCESS FOR RETAINING POLARIZABLE TARGET-PARTICLES AND DEVICE FOR PERFORMING THAT PROCESS

The present invention relates to a novel dielectrophoretic process for retaining polarizable target-particles from a fluid suspension of polarizable target particles, in particular for retaining viable cells from a fluid originating from perfusion culture of animal cells, and a device for performing that process.

High cell density perfusion culture is a method of choice in the in vitro animal cell cultivation for the production of numerous proteins of pharmaceutical interest that are of great commercial value, such as e.g. monoclonal antibodies, HBAg (Hepatitis B surface antigen), tPA (tissue plasminogen activator), EPO (erythropoietin) and β-IFN (beta-interferon). One major advantage of perfusion compared with the other types of cell cultures such as batch or fed-batch, is the much higher productivity per culture volume. This is due to the very high cell densities (10-fold or higher compared to batch or fed-batch) that can be achieved. Another advantage of continuous perfusion culture is that it allows production of proteins, such as e.g. Factor VIII, that have a limited stability in the conditioned culture medium and hence cannot be produced in a batch or fed-batch bioreactor where they remain in that medium for a long time.

High cell densities can only be attained with the use of an efficient cell retention device, located in the effluent stream of the bioreactor. The role of that device is to prevent the entrainment of viable cells outside of the bioreactor during the replenishment of the spent culture medium with fresh medium.

Inclined gravity settlers useful as cell retention devices for cell culture bioreactors are described in U.S. Pat. No. 5,817,505 and WO03/020919. Those inclined gravity settlers, which separate cells using the Boycott effect of enhanced sedimentation, have the drawback of being bulky due to the low fluid flow speed necessary for sedimentation. Furthermore they do not allow a good control of the residence time of cells in the cell retention device, due notably to accumulation of cells near the lower walls of the sedimentation channels, which results in an irregular and erratic return of retained cells to the bioreactor.

WO03/001194 discloses a method and device for spatially separating and/or concentrating biological or non-biological matter particles having a size range 5-200 μm in a fluid by dielectrophoretic trapping thereof, using plate-shaped electrodes and an array of insulating structures disposed in flow channels such as to create a strongly inhomogeneous electric field. Those method and device have the drawback that the trapped particles cause a fouling that is difficult to fix.

G. H: Markx et al., 1994, Journal of Biotechnology 32, 29-37 describe a dielectrophoretic process and device using the positive and negative dielectrophoretic forces created by interdigitated castellated microelectrodes in a 50 μl volume chamber. All cells in a fluid are first trapped near the electrodes by positive dielectrophoresis using a (5V, 10 kHz) signal and then only nonviable cells are separated from the electrodes by negative dielectrophoresis using a (5V, 10 MHz) signal. A major disadvantage of those process and device is the need to re-suspend the cells in a low conductivity medium. Such a process would require the culture broth to be clarified before re-suspending the cells in the new medium. Such an additional step is not adapted to continuous perfusion processes. That separation technique is thus only suitable as a downstream purification step where the main product of fermentation is the biomass itself (e.g. yeast cells). It does not work satisfactorily for perfusion culture of animal cells.

U.S. Pat. No. 5,626,734 describes a filter for perfusion culture of animal cells that allows retaining viable cells in the bioreactor while letting nonviable cells go into the effluent stream. The filter comprises interdigitated electrodes, the flow of the cell-containing fluid being perpendicular to the equatorial plane of those electrodes. The voltage and frequency of the electric signal applied are chosen such that the DEP repulsive force (negative dielectrophoresis force) induced, which has a direction opposite to that of the fluid flow, is greater than the drag of the effluent flow for the viable cells, thereby causing these cells to be retained, and is smaller than the drag of the fluid flow for nonviable cells, the latter thus following the spent medium in the effluent stream. That filter is useful for laboratory purposes but presents serious scale-up limitations. Indeed, the only way to scale-up the system is to increase the surface of the filter.

The problem addressed by the present invention is to provide a process for retaining target-particles in fluid suspensions of target-particles, in particular for retaining viable cells in fluids from perfusion culture of animal cells, and a device for performing that process, which do not have the above mentioned drawbacks of the prior art.

That problem is solved by the invention as defined in the appended claims.

The process for retaining polarizable target-particles from a fluid suspension of polarizable target-particles and the device for performing that process are easily amenable to scale-up by increasing the size and/or multiplying the number of channels. They have notably the advantage compared to known gravity inclined settlers that they allow a very good control of the particle residence time in the system and have an increased perfusion capacity (due to dielectrophoretic forces being much stronger than gravity), thus requiring less space. (The good control of the particle residence time results from the elimination of the accumulation wall limiting scale-up of gravity inclined settlers. In the process and device of the invention, a clarified fluid zone is formed in the vicinity of the wall thereby ensuring the absence of any adhesion of the particles to the wall). Furthermore the process and device of the invention allow retaining selectively viable cells in fluids from perfusion culture of animal cells while letting nonviable cells pass though and be washed out of the system. The use of electric fields is not invasive and both metabolism and cell viability are not altered.

The invention relates to a process for retaining polarizable target-particles from a fluid suspension of polarizable target-particles comprising the steps of pumping that suspension into a vertical or inclined channel and applying an alternating electric field inducing a negative dielectrophoretic force on the target-particles, the force being sufficient to push them a distance of preferably at least or about 25 μm from the surface of an electrode-bearing wall, thereby creating an upward-moving clarified fluid zone in the vicinity of that wall and a downward-moving target-particle containing fluid zone at a distance from that wall.

The polarizable target-particles are particles having a lower polarizability than that of the fluid in which they are contained.

The term "clarified fluid zone" here means a fluid zone substantially clarified from the target-particles. Preferably the average concentration of polarizable target-particles in the clarified fluid zone is at least at or about 25% less than the average concentration in the target-particle containing zone, more preferably at least at or about 50% less, most preferably at least at or about 75% less.

The polarizable target-particles preferably have a higher density than that of the fluid in which they are contained. The target-particle containing fluid zone is thus dense (i.e. denser than the clarified fluid zone) and hence has a downward motion. If the suspension contains different kinds of particles having different polarizabilities, the process can be adjusted such that only some of those particles are target-particles, the other non-targeted particles being in the clarified fluid.

The clarified fluid zone is then buoyant, having a lower density than that of the dense target-particle-containing fluid zone and thus moves upwards. Preferably the electric set-up and the electrode system are such that the upward motion of the buoyant clarified fluid zone is amplified by heat release near the electrodes due to the Joule effect. Where the process is used for retaining viable cells in fluids from perfusion culture of animal cells, this Joule effect is carefully controlled such that the temperature of the suspension does not exceed a given temperature, e.g. 1 or 2° C. above the culture temperature.

The polarizable target-particles may also have the same or a slightly lower density than that of the fluid containing them. The conditions of operation, and in particular the electric set-up, the electrode system and the conductivity of the fluid, are then chosen such that the heat release due to the Joule effect is sufficient to generate an upward-moving clarified layer in the vicinity of the wall, thereby causing by convection a downward-moving suspension at a distance from the wall. If necessary, the downward movement of the suspension can be enhanced by adding particles having a polarizability close to that of the polarizable target-particles and a higher density than that of the fluid.

The electric set-up and the electrode system generate an alternating electric field inducing a negative dielectrophoretic force on the target-particles, the force being sufficient to push them at a distance of preferably at least or about 25 μm, more preferably at or about 25 to 200 μm, in particular at or about 50 to 150 μm, from the surface of an electrode-bearing wall, thereby creating an upward-moving clarified fluid zone in the vicinity of that wall and a downward-moving target-particle containing fluid zone at a distance from that wall. The polarizable target-particles and the suspending medium are chosen so that the particles are less polarizable than the suspending medium. In a preferred embodiment, the polarizable target-particles are selected from prokaryotic cells, yeast and higher eukaryotic cells (such as animal cells, in particular mammalian cells), and the suspending medium is an aqueous or other highly conductive medium.

The process may be performed intermittently by first pumping the suspension into the channel, then applying the alternating electric field and separating the accumulated buoyant clarified fluid zone near the top of the channel and the accumulated dense target-particle containing zone near the bottom of the channel.

Preferably the process is performed continuously, by uninterruptedly pumping the suspension into the channel where the alternating electric field is applied, and uninterruptedly pumping out the clarified fluid accumulated at the top of the channel, with an uninterrupted flow of the suspension of polarizable target-particles out of the bottom of the channel. Where the process is used for retaining viable cells in fluids from perfusion culture of animal cells, the period of continuous operation is generally from 5 minutes to 60 minutes, in particular from 10 minutes to 30 minutes. In the interval between two periods of continuous operation, the channel may be filled with gas introduced by an opening near the top of the channel such as to cause the complete return to the bioreactor of the dense target-particle containing zone. Indeed the latter may not be quantitatively returned to the bioreactor during continuous operation due to its slight viscosity. The backflush process may also be performed by reversing the direction of the liquid flow in the channel.

The channel may have a cross-section of any suitable shape notably rectangular, square, circular or elliptic.

A convenient channel is one having a rectangular cross-section with a ratio length/width equal to at least 5, preferably at least 10, the width being preferably 0.5-1.0 mm.

The length of the channel must be sufficient for the dielectric force to separate the polarizable target-particles and allow an accumulation of the clarified fluid zone at the top of the channel. Generally that length is from 2 to 30 cm, in particular from 5 to 15 cm.

The channel may be vertical or inclined.

Preferably it is vertical or substantially vertical, i.e. with an angle from the vertical of not more than 5°.

When the channel is substantially vertical and has a rectangular cross-section, an interesting electrode system for generating the electric field is one comprising two substantially vertical symmetric plates parallel to the length of the rectangular cross-section, each plate being an array of interdigitated electrodes on an insulating substrate. Each of those symmetric plates generates in its vicinity an alternating field inducing a negative dielectrophoretic force on the target-particles, the force being sufficient to push them at a distance of at least or about 25 μm, preferably at or about 25 to 200 μm, in particular at or about 50 to 150 μm, from the plate. Two symmetric upward-moving clarified fluid zones in the vicinity of the plates are thus created (see FIG. 3). Preferably those symmetric plates are distant 0.5-1.0 mm from each other. Usually, the electrodes are made of gold or platinum on an adhesion layer of chrome or titanium, and the insulating substrate is a glass or an oxidized silicon wafer.

When the channel is inclined and has a rectangular cross-section, an interesting electrode system for generating the electric field is one comprising a superior plate and an inferior plate as specified below, those plates being parallel to the length of the rectangular cross-section. The superior plate is an array of interdigitated electrodes on an insulating substrate generating in its vicinity an alternating field inducing a negative dielectrophoretic force on the target-particles, the force being sufficient to push them at a distance of preferably at least or about 25 μm, more preferably at or about 25 to 200 μm, in particular at or about 50 to 150 μm, from the upper wall. The inferior plate is a different much denser array of interdigitated electrodes on an insulating substrate generating in its vicinity an alternating field inducing a negative dielectrophoretic force on the target-particles, the force being sufficient to push them at a distance of 0.5 to 5 μm from the lower wall. The slight levitation of the particles allows a good control of the adhesive accumulation of particles on the lower wall (problem encountered in conventional inclined gravity settlers) and does not disturb the downward flow of the target-particle containing zone and the upward flow of the clarified zone along the upper wall. (Should a wide clarified zone be created along the lower wall, it would tend to rise vertically and thus disturb those flows)

The alternating voltage applied to the electrodes is generally from 5 to 60 V, preferably 10 to 50 V, peak to peak.

The frequency of the alternating electric field is suitably 0.1-20.0 MHz, preferably 1.0-15.0 MHz.

That frequency is chosen according to the target-particles. Where the suspension contains two kinds of particles having different polarizabilities, e.g. viable cells and nonviable cells, the possible suitable frequency for retaining only one kind of particle (that of lower polarizability) is determined by measuring the dielectrophoretic spectra of these two kinds of particles, using for example electrorotation (Eppmann P. et al., 1999, Colloids and Surfaces Physiochemical and Engineering Aspects, 149(1-3): 443-449 April 15). The particles with higher polarizability will experience a weaker dielectrophoretic force, and will be forced away from the electrode surface less than particles with lower polarizability.

Where the polarizable target-particles are viable cells with the exclusion of nonviable cells from a fluid of perfusion culture of animal cells, the suitable frequency is generally 5.0-15.0 MHz, preferably 8.0-12.0 MHz.

The polarizable target-particles may be in a medium of low conductivity, e.g. polymer particles in deionised water, or in a highly conductive medium such as the culture medium of animal cells, e.g. CHO master culture medium. Such a medium has conductivity $\sigma$ from 1 to 2 S/m.

Where the polarizable target-particles are suspended in a highly conductive medium, in order to avoid high amperage of currents between the electrodes and to limit the increase of temperature by Joule heating, it is preferable that the electrodes are covered with a thin layer of dielectric. The nature of the dielectric isolating substance and the thickness thereof are chosen such that the amperage of currents between the electrodes is acceptable for the electrical energy generator and induces an acceptable Joule heating, and that the electric field generated, and hence the negative dielectrophoretic force which is proportional to the spatial variation of the electric field, is sufficient to push the target particles away from the wall at a distance of at or about 25 to 200 μm, preferably at or about 50 to 150 μm, and accumulate them at a distance therefrom. A suitable thin dielectric layer is a $SiO_2$ layer of thickness 50-500 nm.

The invention also relates to a device particularly adapted for performing the above process.

The invention thus concerns a device for retaining polarizable target-particles from a fluid suspension of polarizable target-particles, the device comprising:

- at least one substantially vertical channel, preferably of rectangular cross-section,
- means for pumping the fluid suspension into the substantially vertical channel (8, 22),
- means for applying an electric field across the channel (5), preferably two plates parallel to the direction of flow in the channel,
- means for providing electrical energy having frequency and voltage applied to the electrodes (12, 13, 13', 14), wherein the electrical energy is adapted to generate an alternating electric field inducing a negative dielectrophoretic force on the target-particles, the force being sufficient to push the polarizable target-particles a distance of at or about 25 to 200 μm, preferably at or about 50 to 150 μm, from the surface of an electrode-electrode bearing wall of the channel to form a clarified fluid zone in the vicinity of that wall, and a target-particle containing zone starting at a distance of at or about 25 to 200 μm, preferably at or about 50 to 150 μm, from that wall, and
- means for evacuating the clarified fluid accumulated at the top of the channel (7) and the target-particle containing suspension that reaches the bottom of the channel (24).

Preferably each plate parallel to the direction of flow in the channel comprises an array of interdigitated electrodes on an insulating substrate.

The device may comprise a number of substantially vertical channels having equipped with means for applying an electric field.

The invention also concerns the above device that is integrated in or coupled to a reactor, in particular a bioreactor.

The process of the invention and the device for performing that process may be used to retain many kinds of particles that are less polarizable than the fluid containing them. They are notably applicable to retaining prokaryotic or eukaryotic cells from a fermentation broth, animal cells, and in particular viable animal cells, from a fluid originating from perfusion culture of animal cells, and for separations involving flocculation such as purification of wastewater, concentration of metal ore slurries and isolation of solid or dissolved chemical products.

Other features and advantages of the present invention will become apparent from the following description, which has an illustrative and not a limitative character. That description will conveniently be read by referring to the appended drawings.

FIG. 1 schematically represents a particle levitator for the measurement of the levitation height of polystyrene/agarose beads and CHO SSF3 cells.

FIGS. 2A and 2B illustrate the principles used in the levitator of FIG. 1, and the process of the invention and the device for performing that process, respectively.

FIG. 3 schematically represents two symmetric plates that are arrays of interdigitated electrodes on a substrate that partially delimit a parallelepiped-shaped channel, and the main fluid flows in that channel.

Figure 7A:
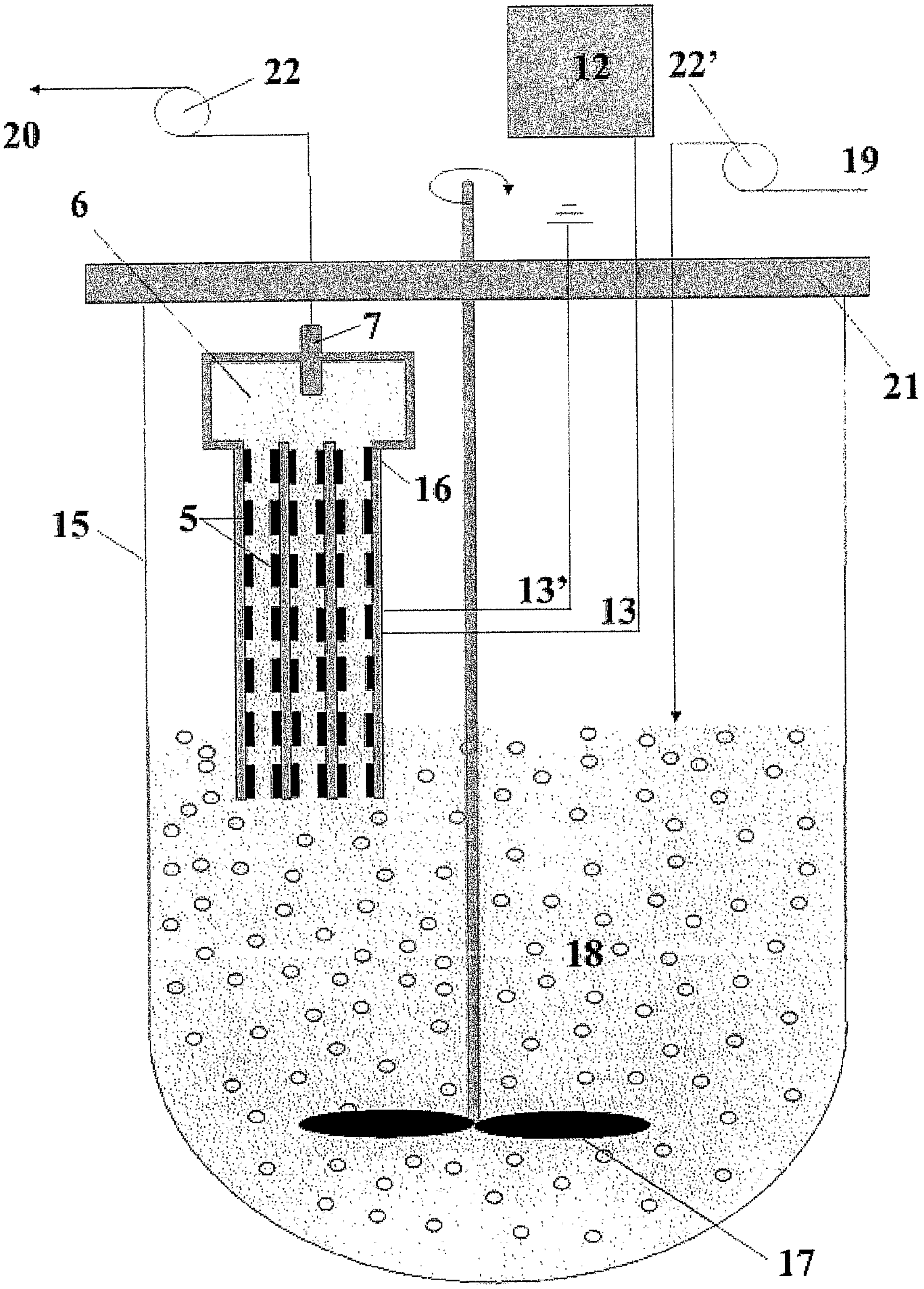
Figure 7B:
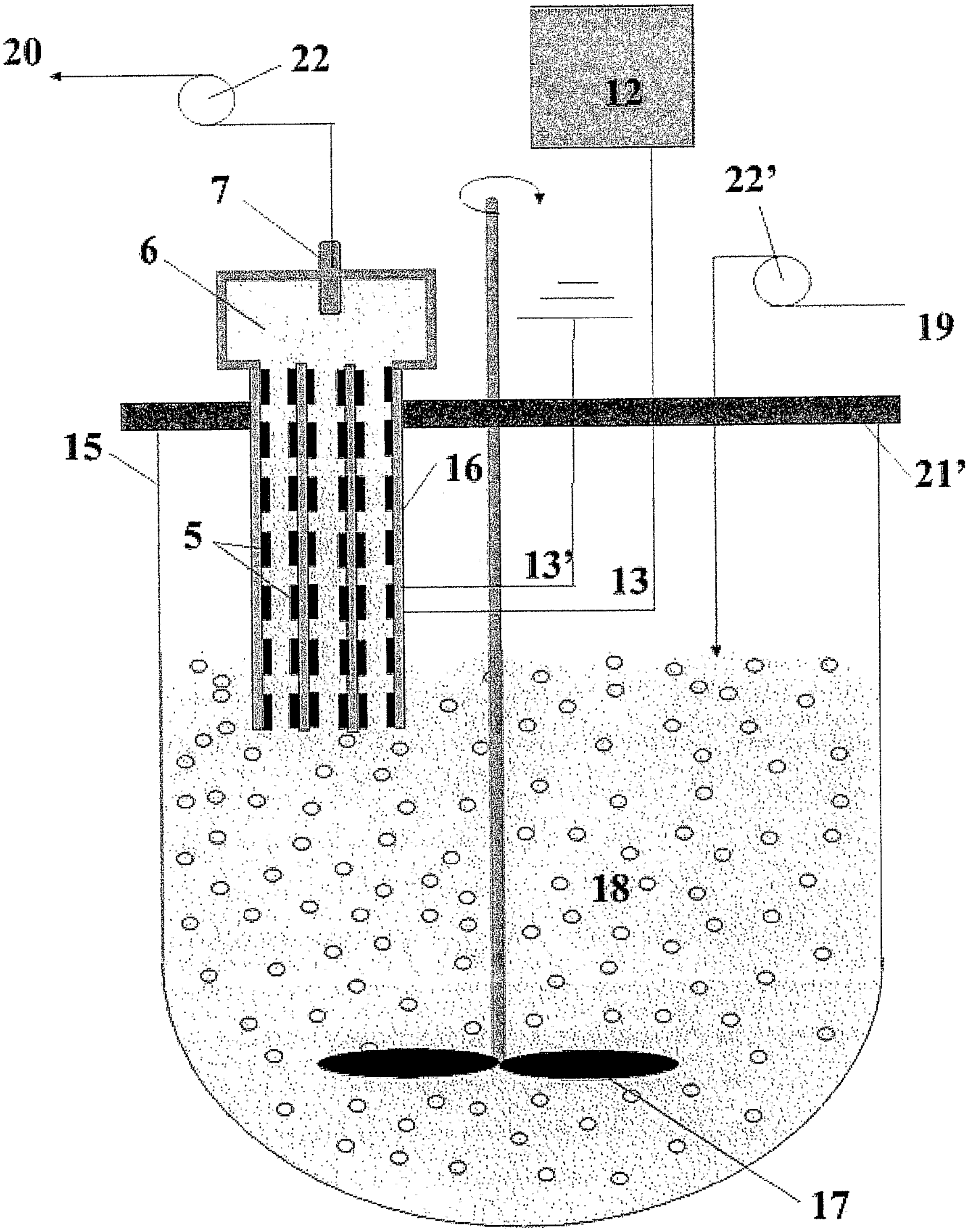

FIGS. 7A and 7B schematically represent two embodiments of a device according to the invention that is integrated in a reactor.

Figure 8:
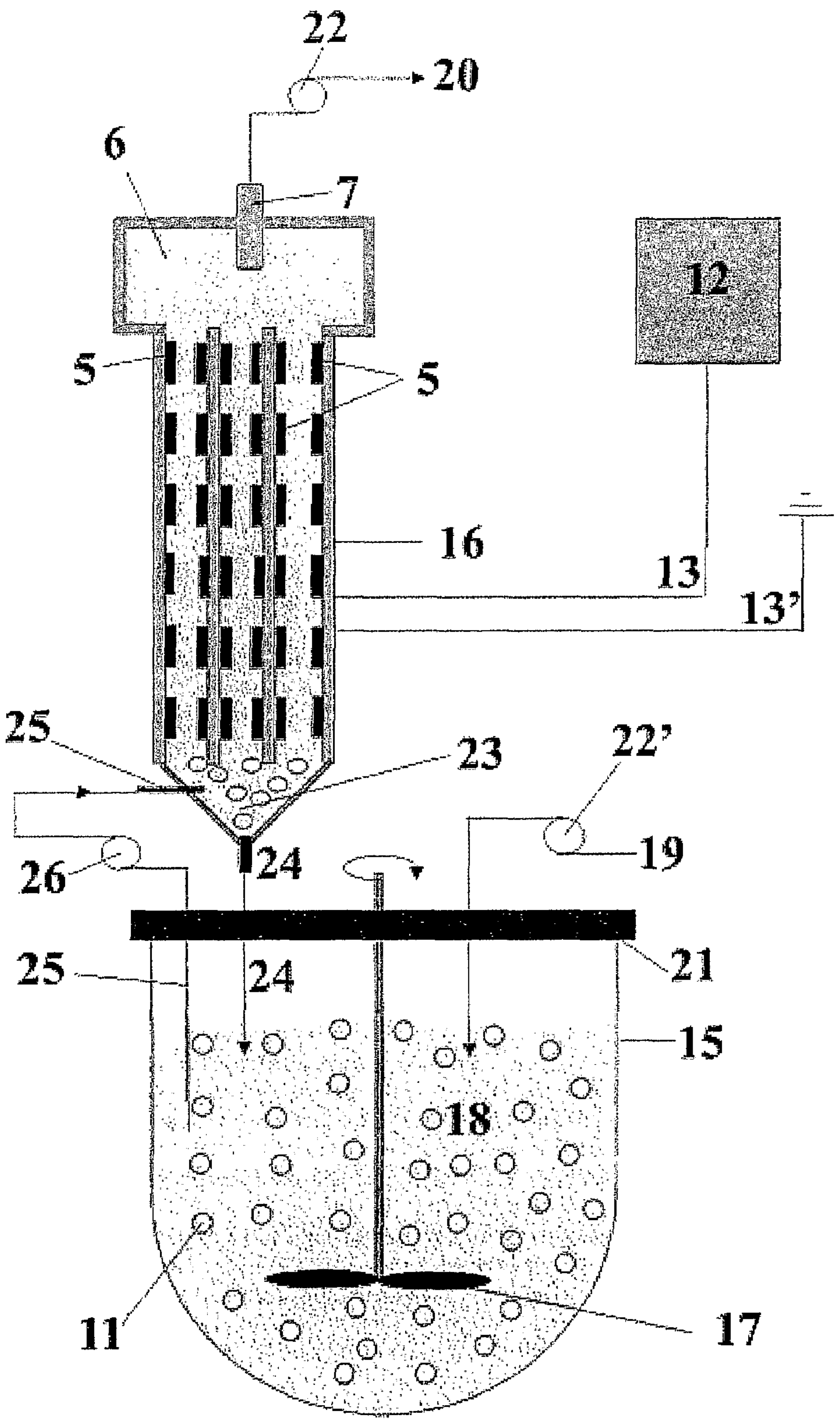

FIG. 8 schematically represents a device according to the invention that is coupled to a reactor.

1) Levitation Experiments

This section describes experiments using a particle levitator useful for demonstrating dielectrophoresis.

a) Introduction

The levitation experiments measure, either in a qualitative or in a quantitative way, the response of particles (polystyrene and agarose beads, CHO SSF3 cells) suspended in media of increasing conductivities (UHP water, conductivity $\sigma$=0.00018 S/m; KCl solutions 0.01-0.1 M, CHO-Master® HP-1 culture medium, conductivity $\sigma$=1.333 S/m) to a highly inhomogeneous electric field generated by an array of interdigitated microelectrodes.

A qualitative approach consists in microscopically observing the levitation using the setup described below. The applied electric field removes the particles or cells settled on the electrode surface and makes them levitate at a given height above the wall. This levitation height can be quantitatively assessed by successively focusing the microscope on the electrodes and on the levitating particles. Calibration of the apparatus allows the measurement of the height difference between the two focal points, as proposed by Marks G. H. et al., 1997, Journal of Physics and Applied Physics, 30(17), 2470-77.

The measurement of the levitation height of the particles (as described above) enables the calculation of the polarizability of the particles (and of their dielectric properties i.e. their conductivity [Siemens/m] and their permittivity [Farads/m]) and of the dielectrophoretic (DEP) force influencing these particles.

b)Materials and Methods b.1. Microorganism and Medium

CHO SSF3 (suspension serum—free Chinese hamster ovary cells) available from Novartis (Basel, Switzerland). These cells secrete recombinant secretory component (SC), a glycoprotein of molecular weight 66 kD. SC is a major component of the type A secretory immunoglobulin, sIgA. Cells from a working cell bank, stored at −196° C., were rapidly thawed at 37° C. and used to inoculate a T-flask (75 ml, Falcon, Beckton Dickinson, Sweden) containing 15 ml of a protein free culture medium (CHO Master® HP-1, Cell Culture Technologies, Zurich, Switzerland) to an initial cell density of $2\times10^5$ cell/ml. After incubation at a temperature of 37° C., under a humidified atmosphere of air containing 5% $Co_2$, cells were harvested upon reaching a density of 16 cell/ml and used to inoculate a 250 ml spinner flask (Integra Biosciences GmbH, Fernwald, Germany) containing 120 ml of culture medium. Upon reaching a cell density of $1\times10^6$ cell/ml the cells are used for levitation experiments using culture medium (conductivity 1.333 S/m).

b.2. Polystyrene and Agarose Beads

For levitation experiments in low conductive media (UHP water, conductivity 0.00018 S/m) as well as experiments in media of increasing conductivity (KCl solutions at concentration between 0.001 M and 0.1 M), synthetic beads were used. These particles are:

- Polybead® Polystyrene microspheres, 15 μm in diameter monodisperse, low interfacial conductivity, permittivity~2.5 (Polysciences, Inc., Warrington, USA), and
- Superhose 6® agarose beads for chromatography columns, 12 μm in diameter with a size distribution (Pharmacia Biotech, Germany).

b.3. Particle Levitator

Figure 1:
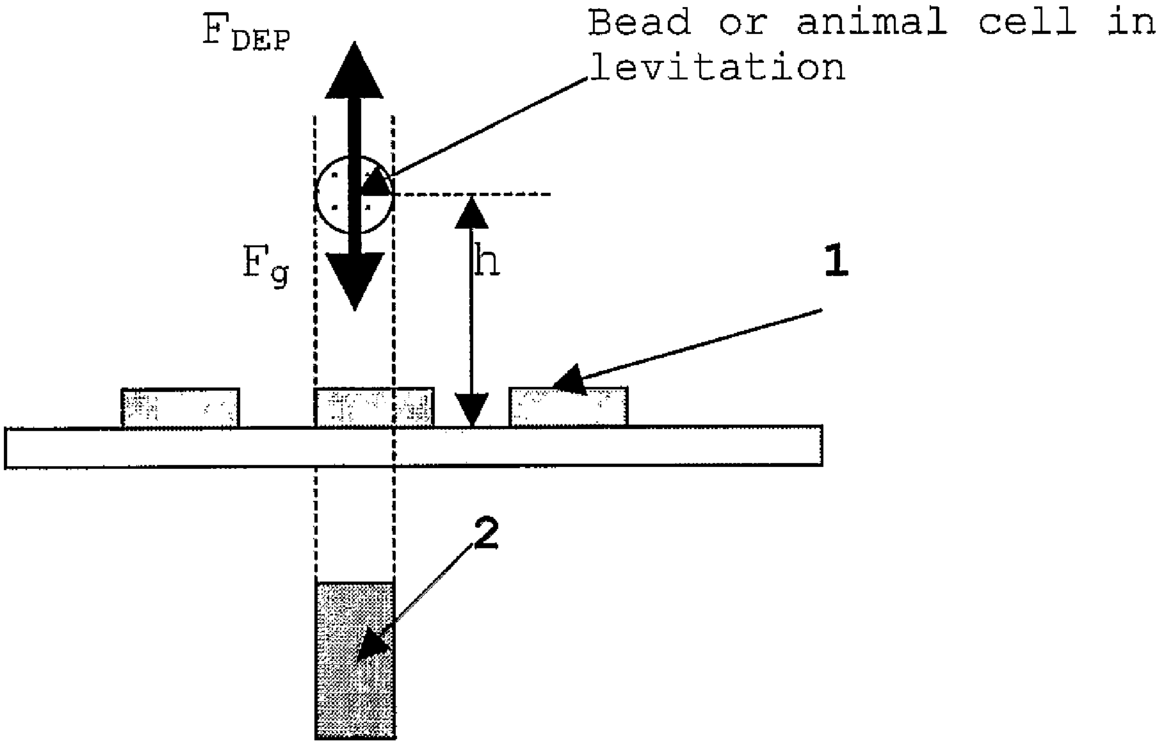

The following description will be better understood by referring to FIG. 1. An interdigitated gold microelectrode array 1, wherein the gold may be covered with a thin layer of $SiO_2$, is constructed on a glass wafer. This glass wafer is then positioned on an inversed microscope 2 (Carl Zeiss AG, Switzerland). The levitation is observed from below. First the particles randomly settle on the electrodes and between them on the glass wafer. Then, a potential of 20 V and a frequency, varying according to the experiment from 0.1 to 20 MHz, is suddenly applied between the arms of electrode array and the possible upward motion of the particles is observed with the microscope.

c) Results

With the above experiments and methods, the following was shown.

- Polystyrene or agarose beads in deionized water easily levitate at a frequency of 1 MHz.
- Levitation of CHO SSF3 cells suspended in CHO-Master® HP-1 culture medium may be observed using a modified interdigitated gold microelectrode array on a glass wafer wherein a 200 nm thick $SiO_2$ layer is applied on gold in a frequency range from 1 to 20 MHz. In a frequency range from 5 to 15 MHz, and particularly from 8 to 12 MHz, only levitation of viable cells (stained in blue) should be observed.

Figure 2A:
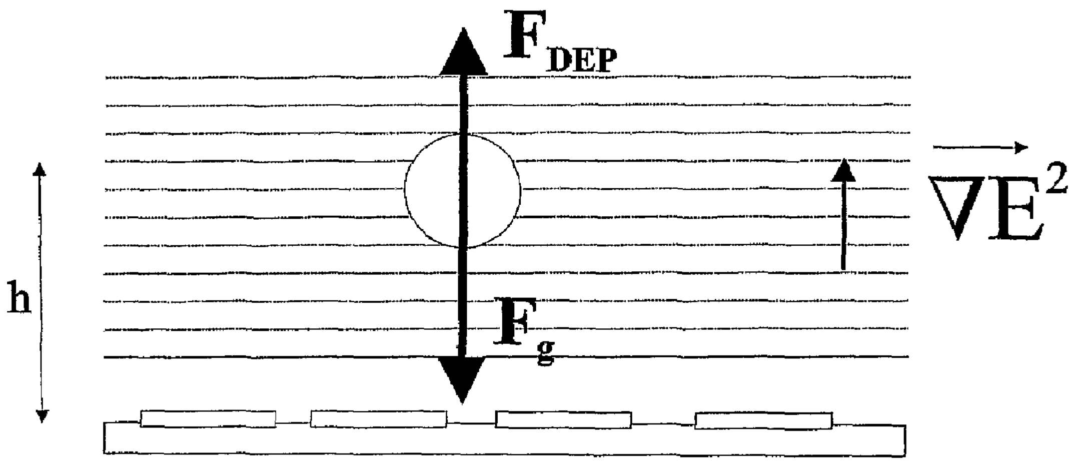
Figure 2B:
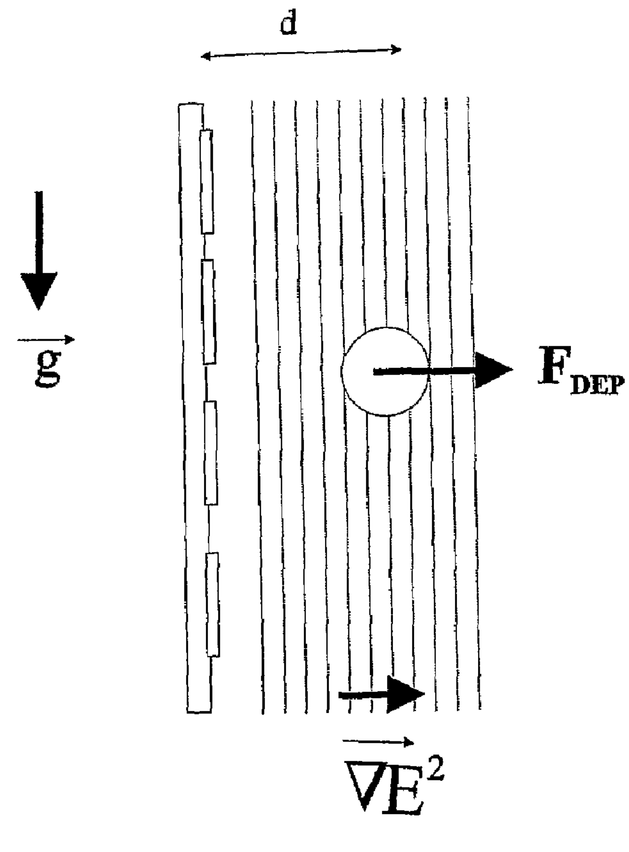

2) Description of Different Embodiments of the Invention a) Principle Used: the Horizontal Negative Dielectrophoretic Force FIGS. 2A and 2B illustrate the principles used in the above-described levitator, and the process and device of the invention, respectively.

When positioned in a non-uniform electric field, a particle or a cell suspended in a medium of higher polarizability (e.g. a polystyrene or agarose bead in deionised water or an animal cell in a highly conductive medium such as CHO master HP-1 of conductivity=1.333 S/m) will experience a strong repulsive force pushing it away from regions of high field intensities. This is called negative dielectrophoresis.

When the electrode wall is positioned horizontally (FIG. 2A), as is the case for the levitator, particles or cells will be levitated at a given height h above the electrodes at which the vertical negative dielectrophoretic force $F_{DEP}$, which is proportional to the variation of the electric field $\nabla E^2$, is equal to the vertical gravity force $F_g$.

When the electrode wall is positioned vertically (FIG. 2B), particles or cells will be pushed away from the solid boundary by a horizontal negative dielectrophoretic force $F_{DEP\ P}$ and downwards by the vertical gravity force.

b) A Preferred Electrode System

Figure 3:
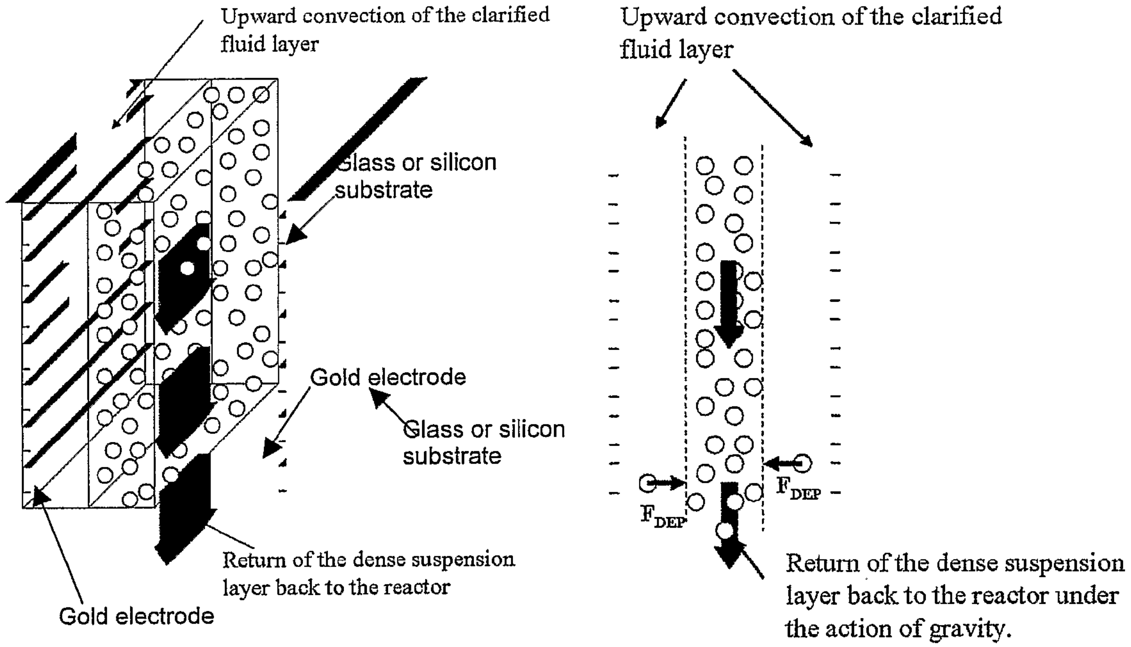

FIG. 3 schematically represents two symmetric plates, which are arrays of interdigitated gold electrodes on a glass or oxidized silicon substrate, which are positioned vertically parallel to each other and form part of two faces of a parallepipped-shaped canal. The distance between those plates is typically 0.5-1.0 mm. On the right-hand part of FIG. 3, one can see the central downward-moving dense target-particle containing fluid flow and the two lateral upward-moving buoyant clarified fluid flows.

Figure 4:
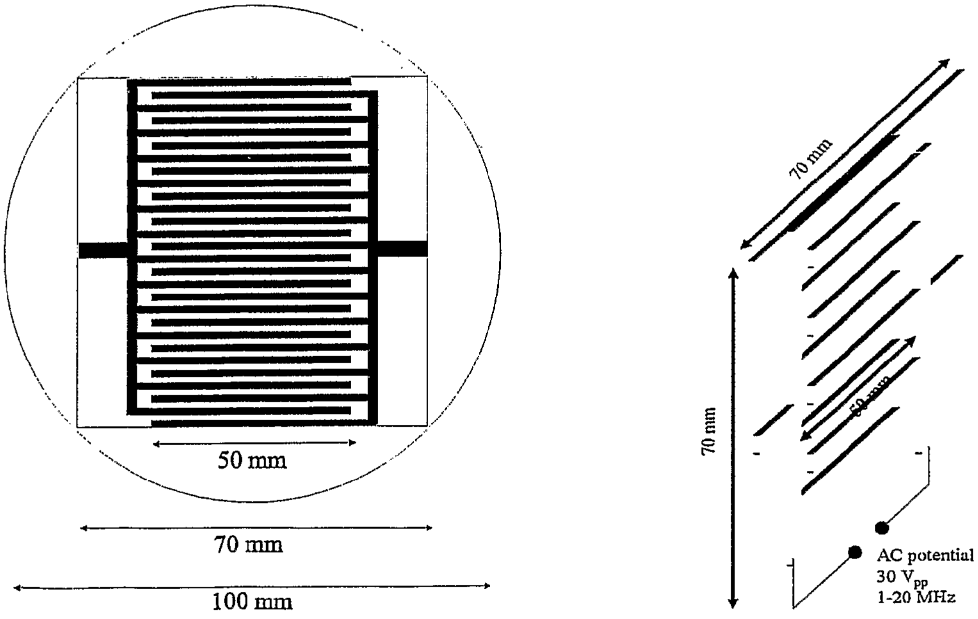
FIG. 4 shows the structure and dimensions of each of those arrays of interdigitated electrodes on a substrate

FIG. 4 schematically represents the structure and the dimensions of arrays of interdigitated gold electrodes. One side of the array is energized with an ac potential (from 0.1 to 20 MHz, up to 30 volts peak-peak typically) and the other side is maintained to earth potential. Electrodes are usually made of Cr/Au or Ti/Pt or Cr/Au on glass or oxidized silicon wafers. Coating with a thin $SiO_2$ layer is possible in order to insulate and protect the electrodes and minimize the electrical current flowing in the system.

Figure 5:
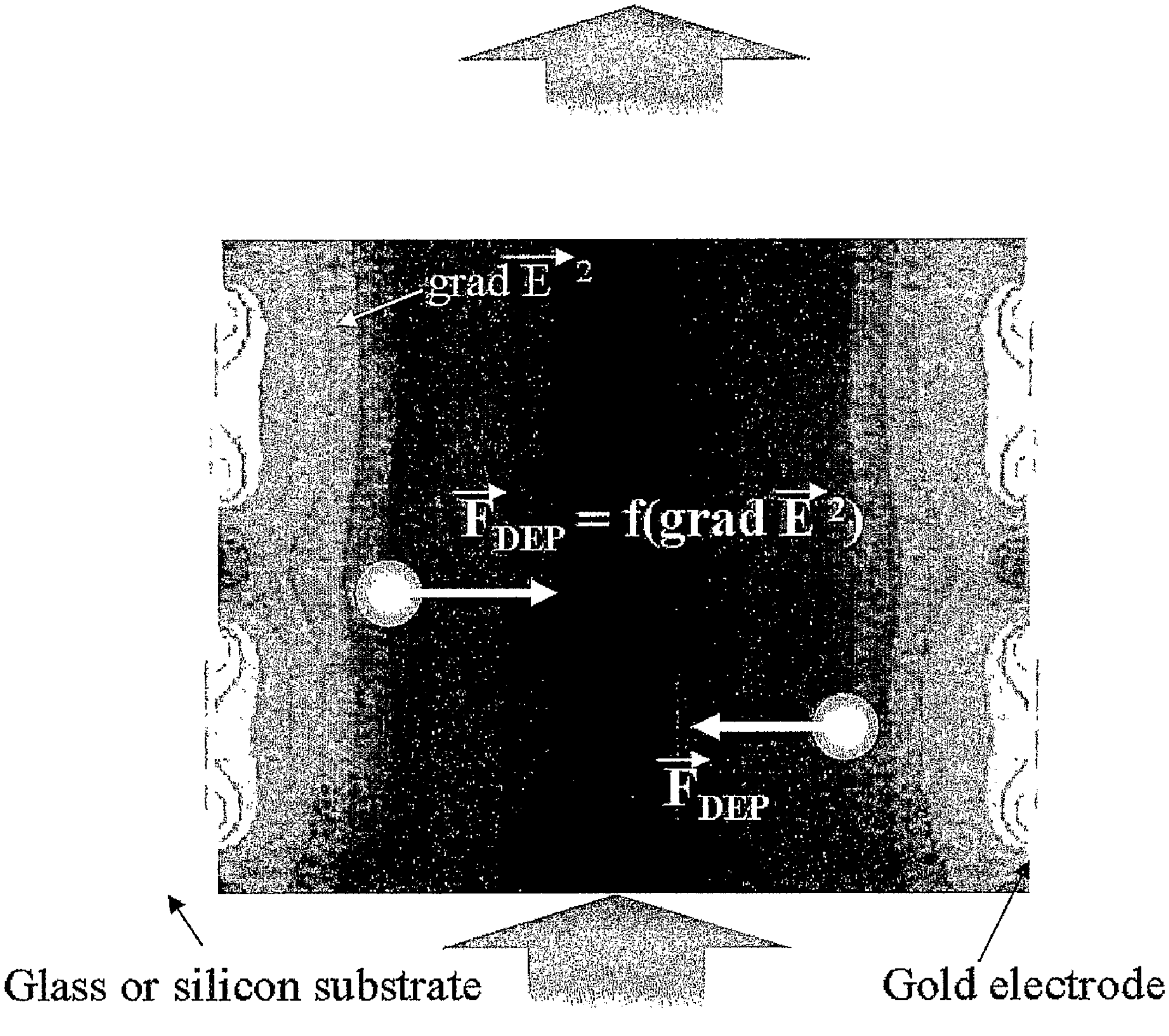
FIG. 5 shows the local intensity of the gradient of the electric field in the vicinity of the electrodes.

FIG. 5 shows the electric field generated in the vicinity of the electrodes. The lines describe the local intensity of the gradient of the DEP force. The darker the color, the weaker the intensity of this vector and the weaker the DEP force. Particles or cells near the electrode surface will experience a strong repulsive force pushing them away from the wall and accumulating them in the center of the channel.

c) A Set-Up for Performing the Process of the Invention

Figure 6:
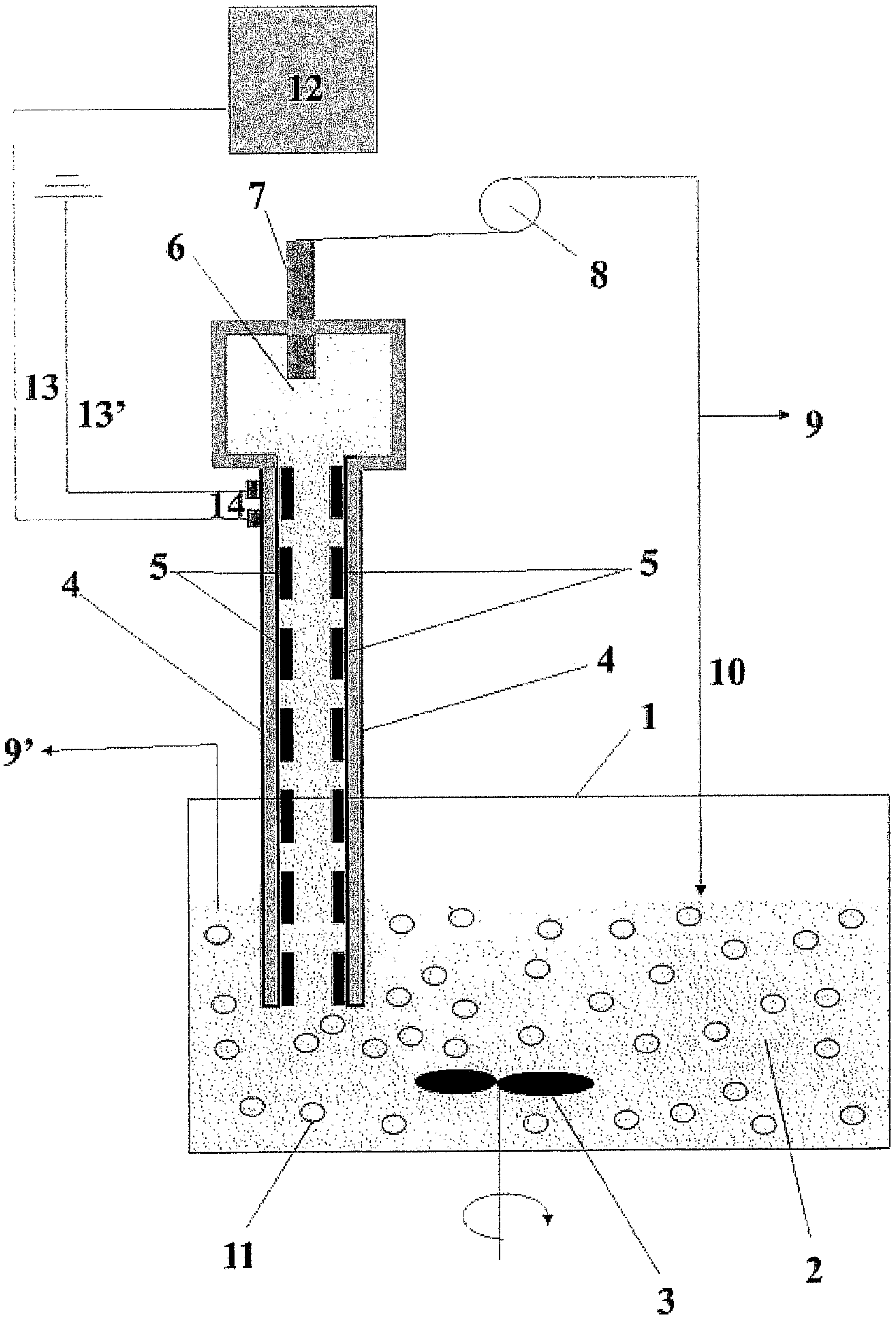
FIG. 6 represents an experimental set-up comprising a device according to the invention that is dipping into an open reservoir containing a fluid suspension of target-particles.

FIG. 6 represents an experimental set-up comprising a device according to the invention that is dipping into an open reservoir containing a fluid suspension of target-particles.

The suspension of beads or cells 2 was stirred in the feed open reservoir 1. A pump 8 forced the suspension 2 to flow through the rectangular channel of width 0.5 mm or 1 mm formed by parallel wafers 4 made of glass or oxidized silicon on which interdigitated systems of electrodes 5 (similar to those described above in b)) were structured. One side of the interdigitated systems was energized by connection (13, 14) to an AC voltage source 12 while the other side of the interdigitated system was connected (13', 14) to earth potential. Buoyant clarified fluid formed in the vicinity of the electrode systems 5 by the action of dielectrophoretic forces accumulates at the top of the channel in the clarified fluid accumulation zone 6. Pump 8 was then used to continuously remove clarified fluid from the top clarified zone 6 through a tube 7 while forcing the suspension 2 to flow through the rectangular channel. This clarified fluid was either re-circulated through a re-circulation loop 10 or sampled through a sampling line 9 for further analysis (concentration of particles, particle size distribution). Additionally, the feed reservoir was sampled through a feed sampling line 9' for further analysis concentration of particles, particle size distribution)

d) Experiments With the Above Set-Up

Experiments Were Carried Out as Follows:

- the channel was filled with a suspension of polystyrene beads in deionized water having a low conductivity (0.00018 S/m)at a concentration of $10^6$ particles /ml,
  - (using Polybead® Polystyrene microspheres marketed by Polysciences Inc, Warrington, USA: 15 μm in diameter monodisperse, density of 1.05 g/l, low interfacial conductivity, permittivity of about 2.5)
- the electrode system was activated using a 1 MHz frequency and a AC voltage of 40 V peak to peak,
- after 15 minutes, the pump was activated.

Samples were taken at sampling port for overflow 9 and sampling port for feed 9' as a function of time (every 10 minutes up to 200 minutes) and their concentration of particles manually measured on a haemacytometer. The retention efficiency R was calculated.

$$R = \frac{Xf - Xo}{Xf} \cdot 100\%$$

wherein

- Xf: number of particles per ml measured in feed samples
- Xo: number of particles per ml measured in overflow samples.

The overflow rate was 1.2 l/day (considerably higher than for a conventional inclined gravity settler of comparable dimensions).

The above experiments showed that the retention efficiency almost instantly reached a steady state of 100% and remained constant for all the period observed.

e) A Device According to the Invention that is Integrated in a Reactor

FIGS. 7A and 7B schematically represent two embodiments of a device according to the invention that is integrated in a reactor.

FIG. 7A

A suspension of beads or cells 18 is contained in a stirred tank reactor or bioreactor 15 equipped with a stirrer 17 and a top cover plate 21. This reactor 15 is continuously fed through feeding line 19 and pump 22'. In this embodiment, the multichannel (3 channels are represented) dielectrophoretic separator 16 is small enough in volume to be fully integrated in the reactor 15 and dip directly into the suspension 18. An overflow pump 22 forces the suspension 18 to flow through the dielectrophoretic separator 16 and the clarified fluid accumulating at the top of the separator 6 to be removed through the overflow stream 20.

FIG. 7B

A suspension of beads or cells 18 is contained in a stirred tank reactor or bioreactor 15 equipped with a stirrer 17 and a top cover plate 21'. This reactor 15 is continuously fed through feeding line 19 and pump 22'. In this embodiment, the multi-channel (3 channels are represented) dielectrophoretic separator 16 is too voluminous to be fully integrated in the reactor 15. The top cover plate 21' has hence been modified to allow this integration in such a way that the dielectrophoretic separator 16 can dip into the suspension 18. An overflow pump 22 forces the suspension 18 to flow through the dielectrophoretic separator 16 and the clarified fluid accumulating at the top of the separator 6 to be removed through the overflow stream 20.

f) A Device According to the Invention that is Coupled to a Reactor

FIG. 8 schematically represents a device according to the invention that is coupled to a reactor.

A suspension of beads or cells 18 is contained in a stirred tank reactor or bioreactor 15 equipped with a stirrer 17 and a top cover plate 21. This reactor is continuously fed through feeding line 19 and pump 22'. In this embodiment, the multichannel (3 channels are represented) dielectrophoretic separator 16 is too voluminous to be integrated in the reactor 15 with a modification of the top cover. The separator 16 is hence operated as an external retention system. Therefore, it can be placed in a re-circulation loop. A feeding pump 26 forces the suspension 18 to flow through the separator feeding line 25 and enter the separator 16. Concentrated suspension accumulated at the bottom of the separator, in the feeding zone 23, and return back to the reactor 15 through the re-circulation line 24. Clarified fluid accumulates at the top of the separator 16 in the clarified fluid accumulation zone 6 and is pumped continuously by means of a pump 22 through the overflow stream 20.

The invention claimed is:

1. A device for retaining polarizable target particles from a fluid suspension of target particles, said device comprising:

(i) a substantially vertically oriented chamber having two opposed vertical side walls, a top and a bottom, an outlet opening at the top and, at or near said two opposed vertical side walls, an array of interdigitated electrodes, wherein:

a channel is formed between said arrays of electrodes within said vertically oriented chamber, said chamber having a slanted bottom wall extending at an angle from horizontal, an inlet opening near the bottom of said chamber and a separate outlet opening in said slanted bottom wall, and said inlet opening being above said separate outlet opening, and whereby fluid entering at said inlet opening near the bottom of the chamber when in use travels in a vertical direction in the channel between the two arrays of electrodes, and out said outlet opening at the top, and target particles within the fluid exit through said separate outlet opening, below said inlet opening, in said slanted bottom wall of said chamber;

(ii) a pump for pumping fluid into said inlet opening, through said channel of said chamber, and out said outlet opening at the top of said chamber; and (iii) a provider of electrical energy for providing electrical energy to said arrays of electrodes so as to generate an alternating electric field across said channel.

2. The device according to claim 1, wherein the arrays of interdigitated electrodes are located 0.5 to 1.0 mm from each other.

3. The device according to claim 1, wherein the frequency of the alternating electric field is 0.1 to 20.0 MHz.

4. The device according to claim 1, wherein the device is integrated in or coupled with a reactor.

5. The device according to claim 1, wherein said arrays of interdigitated electrodes are disposed on an insulating substrate.

6. The device according to claim 5, wherein the electrodes are made of gold or platinum on an adhesion layer of chrome or titanium.

7. The device according to claim 5, wherein the insulating substrate is a glass or an oxidized silicon wafer.

8. A process for retaining polarizable target particles from a fluid suspension of polarizable target particles, comprising:

providing the device of claim 1; and pumping the fluid suspension into the channel of the device and applying an alternating electric field to the fluid suspension, thereby inducing a negative dielectrophoretic force on the target particles, wherein the force is sufficient to push the particles a distance from the surface of the vertical side walls, thereby creating an upward-moving clarified fluid zone in the vicinity of the vertical side walls and a downward-moving target particle containing fluid zone at a distance from the vertical side walls.

9. The process according to claim 8 wherein the voltage is 5 to 60 V, peak to peak.

10. The process according to claim 8, wherein the target particles are viable cells and the suspension comprises a perfusion fluid culture of animal cells.

11. The process according to claim 8, wherein the target particles are selected from the group consisting of prokaryotic cells, eukaryotic cells, yeast cells, animal cells, and mixtures thereof.

12. The process according to claim 8, wherein the dielectrophoretic force is sufficient to push the target particles a distance of at least about 25 μm from the surface of the vertical side walls.

13. The process according to claim 12, wherein the dielectrophoretic force is sufficient to push the target particles a distance of from about 25 to 200 μm from the surface of the vertical side walls.

14. The process according to claim 13, wherein the dielectrophoretic force is sufficient to push the target particles a distance of from about 50 to 150 μm from the surface of the vertical side walls.

15. The process according to claim 8 wherein the channel is substantially vertical.

16. The process according to claim 15 wherein the substantially vertical channel has a rectangular cross section and the alternative electric field is generated by an electrode system comprising two symmetric plates parallel to the length of the rectangular cross section, wherein each plate is an array of interdigitated electrodes on an insulating substrate.

17. The process according to claim 16 wherein the electrodes are made of gold or platinum on an adhesion layer of chrome or titanium.

18. The process according to claim 16 wherein the symmetric plates are at a distance of from 0.5 to 1.0 mm from each other.

19. The process according to claim 8 wherein the polarizable target particles are suspended in a highly conductive medium having a conductivity of 0.7 top 3.0 S/m.

20. The process according to claim 19 wherein the medium has a conductivity of from 1.0 to 2.0 S/m.

21. The process according to claim 19 wherein the electrodes are covered with a thin layer of a dielectric having a thickness of 50-500 nm.

22. The process according to claim 21 wherein the dielectric is $SiO_2$.

23. The process according to claim 8 wherein the frequency of the alternating electric field is 0.01 to 200 MHz.

24. The process according to claim 23 wherein the frequency of the alternating electric field is 1.0-15.0 MHz.

25. The process according to claim 24 wherein the voltage is 10 to 50 V, peak to peak.

* * * * *